US008306005B1

(12) United States Patent  
Gurin

(10) Patent No.: US 8,306,005 B1  
(45) Date of Patent: *Nov. 6, 2012

(54) DYNAMIC COMMUNICATION AND METHOD OF USE

(76) Inventor: Michael Gurin, Glenview, IL (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/114,043

(22) Filed: May 24, 2011

Related U.S. Application Data

(63) Continuation of application No. 10/050,838, filed on Jan. 16, 2002, now abandoned.

(60) Provisional application No. 60/261,637, filed on Jan. 16, 2001.

(51) Int. Cl.
*H04W 4/00* (2006.01)

(52) U.S. Cl. ........................................................ 370/338

(58) Field of Classification Search .......... 370/328–339; 455/456.1, 456.3, 457
See application file for complete search history.

(56) References Cited

U.S. PATENT DOCUMENTS

| | | | | |
|---|---|---|---|---|
| 5,029,183 A * | 7/1991 | Tymes | ........................... | 375/141 |
| 5,640,002 A * | 6/1997 | Ruppert et al. | .......... | 235/462.46 |
| 6,091,656 A * | 7/2000 | Ooishi | ........................ | 365/226 |
| 7,515,914 B2 * | 4/2009 | Herrod et al. | .............. | 455/456.1 |
| 7,725,326 B1 * | 5/2010 | Tracy et al. | .................... | 705/1.1 |
| 7,739,353 B2 * | 6/2010 | Philyaw | ....................... | 709/217 |

* cited by examiner

*Primary Examiner* — Frank Duong

(57) ABSTRACT

A communication system and method for enhancing the effectiveness of wireless and wired systems. The communication system comprising a combination of (A) a communication device with two separate transceivers and a unique access number (B) said transceivers with a short-range wireless or wired transceiver and long-range wireless transceiver, (C) a communication management system from the group of local communication management system for individual coordinated device connectivity, distributed communication management system for management of multiple communication devices, (D) said communication management system performing dynamic switching of communication transceivers and dynamic addressing of communication devices within the network of communication devices. Suitable wireless medium include wireless optical means, wireless power-line carrier means, wireless radio-frequency means, and wireless radar means. Suitable wired medium include serial, parallel, USB, Firewire, Ethernet, optical fiber, and RS-485 communication means. The communication management system ensures seamless and ubiquitous communication between wired and wireless devices. The communication system, when utilizing dynamic communication for wireless or wired roaming communications in-conjunction with dynamic switching and addressing, enhances the performance and effectiveness that are beneficial to most communication devices.

19 Claims, 5 Drawing Sheets

DYNAMIC COMMUNICATION AND METHOD OF USE

CROSS-REFERENCE TO RELATED APPLICATIONS

This application is a continuation of U.S. patent application Ser. No. 10/050,838 filed on Jan. 16, 2002 now abandoned, and claims priority from U.S. Provisional Patent Application Ser. No. 60/261,637 filed Jan. 16, 2001.

BACKGROUND OF THE INVENTION

The present invention relates to dynamic communication for wireless and wired roaming communications devices and methods for enhancing the communications channel medium, and in particular to the use of dynamic switching and addressing in wireless and wired communications to enhance the performance and cost effectiveness of wireless and wired media.

This invention relates to telecommunications networks, and more particularly to telecommunications networks employing dynamic protocol switching and addressing for communication links. The recent increase in wireless communications has created demands for less expensive means with faster response times and more system flexibility for universal access.

When the user requests communication from an area outside of the assigned geographic location, the requested communication must first be sent to the assigned geographic location and then forwarded to its final destination. Disadvantageously, static Internet Protocol (IP) addressing has been known to create long response times and possibly reduced throughput. Attempts have been made to solve some of these problems with dynamic IP addressing. Dynamic IP addressing assigns a new temporary IP address local to the requesting device according to its current location. Therefore, Internet access requests outside of the originally assigned network do not have to be routed back through the originally assigned network. Instead, communications may be processed directly at the geographic location of the new temporary local address.

U.S. Pat. No. 6,052,725 discloses a communication system having a local network communicating with a remote network for assigning a dynamic IP address to a communication device and an IP network by providing both local and non-local dynamic IP addressing to reduce the response times, increase service availability for Internet access requests, and allow access to more networks. Once a non-local dynamic IP address can be assigned to satisfy the address request, the non-local dynamic IP address will be maintained for the duration of the communication session between the communication device and the IP network. Therefore the notion of dynamic addressing is limited to the establishment of the communications session thus preventing dynamic addressing and switching to occur within one communications session.

When the user requests wireless communication using traditional cellular phone, the requested communication is channeled through an expensive resource with relatively limited bandwidth. Disadvantageously, cellular phone systems are becoming more bandwidth constrained as both the demand is increasing significantly and the applications demanding bandwidth are becoming more communications intensive. Attempts have been made to solve some of these problems with dual mode communications within the cellular bandwidth. Dual mode handsets utilizes low range cellular overlay cells to the requesting device to serve as a call forwarding transceiver according to its home location.

U.S. Pat. No. 5,887,259 discloses a multiple mode, personal wireless communications system that exists within a radiotelephone network serving general customers and provides additional services to a select group of customers. The system uses handsets that automatically switch between a standard cellular radiotelephone mode of operation and an enhanced cordless mode when the handsets are within range of pico cells that are interconnected to the public switched telephone network. The term "pico" is used herein to suggest a smaller size than conventional cellular radio telephone cells. Pico cells are provided at customer selected locations to cooperate with a framework of overlay cells that operate independently of the cells of the cellular network. Each pico cell is controlled via a framework of overlay cells that operates independently of the radiotelephone network and uses a unique control protocol on a small number of reserved cellular channels. Once the communications link is established, the inability to switch between modes prevents seamless operation. Therefore the notion of dynamic switching of modes is limited to the a) establishment of two modes within one radio per handset (in reality both modes are cellular modes simply using two channels, a low power channel and a high power channel), b) the handset is registered to one pico station designated as "home" that receives a call forwarded to the pico station telephone number, c) establishment of one communications link per pico station, and d) cancellation of short range pico mode when carried out of range of the pico station.

The present invention provides a new and improved wireless communications enhancement for conveying of analog and digital data and method of use.

SUMMARY OF THE INVENTION

In accordance with one aspect of the present invention, a dynamic communication system is provided. The system includes an integrated short-range wireless or wired transceiver, an integrated long-range wireless transceiver, an integrated communication management system and a unique identification number therein.

In accordance with another aspect of the present invention, a communication management system is provided. The communication management system includes a local communication management system integral to the InterActMe communication device and a distributed communication management systems that preferably establishes a communications link with the short-range wireless or wired transceiver.

In accordance with another aspect of the present invention, the communication management system utilizes a look up table to establish the originator and terminator(s) link of the communications link and a prioritization process in choosing from multiple connection options. The process includes the utilizing of algorithms to determine optimal switching between short-range and long-range transceivers, between one address and another address, between a channel manager and another channel manager, and between one routing means and another routing means and to determine the optimal time to switch of any of the preceding states.

In accordance with another aspect of the present invention, the communication device establishes a known geographic presence. The geographic presence is determined by numerous methods that include signal strength triangulation, integrated global positioning systems with actual communication device, and communication access port. The processes that benefit from knowledge of geographic location are numerous that include safety, marketing, optimal routing, addressing, and communications link, audit trail for payroll, to individual profiling.

In accordance with yet another aspect of the present invention, the communication device extends the notion of caller identification (Caller-ID). The Caller-ID extension includes both the call originator and call terminator access numbers (prior referenced names can be alternatively shown).

In accordance with another aspect of the present invention, the communication device reads context sensitive data. The context sensitive data is read by numerous methods that include bar code scanners, radio frequency identification tags, infrared transceivers, and optical readers.

As used herein, the term communication management system is used to imply the coordinated and integrated operations of local and remote channel managers, dynamic routing systems, and a routing manager system.

The term "wireless" refers to the non-wired measures to establish communications. This includes though not limited to infrared, radio frequency, cellular, radar, and power-line carrier.

The term "wired" refers to the use of physical electrical or optical connectivity to establish communications. This includes though not limited to the use of serial, parallel, USB, Firewire, Ethernet, optical fiber, and RS-485 port communication.

The term "access number" refers to the traditional identification number utilized within the respective communication protocol. Exemplary access numbers include telephone numbers, Internet Protocol addresses, device path and node numbers, unique identification numbers that are cross-referenced in a table.

The term "access port" refers to the physical port at which the wireless communication is transmitted and received from the communications system to each communications device.

The term "seamless" refers to the transparent, non-noticeable, and continuous maintenance of communications despite the transition from one communications medium, port, or device to another.

The term "algorithm" refers to calculations, rules, and parameter values utilized to determine the change of state in a deterministic manner.

The term "warning signal" refers to visual, audio, mechanical signals indicating the occurrence of a specific event or status of a specific parameter. This includes though not limited to LEDs, tone generator, LCD display, vibrator, and lights.

The term "communications link" refers to the successful bi-directional conveyance of data, whether analog or digital, between two or more communication devices.

The term "threshold" refers to an operational range for one or more critical parameters that establishes a targeted envelope of operation.

The term "phone call" refers to the simultaneous bi-directional exchange of digital or analog data, which includes standard voice and data exchange.

The term "walkie-talkie" refers to uni-directional exchange of digital or analog data, which includes messaging, paging, data exchange, and standard voice.

One advantage of the present invention is that cost effectiveness of wireless and wired communications is increased.

Another advantage of the present invention is that cellular channel resources are reduced, by utilizing alternative short-range communication means.

Yet another advantage of the present invention is that the dynamic addressing and look up tables enhance ubiquitous communication.

A further advantage of the present invention derives from identification of both the communications link originator and terminator to minimize non-prioritized interruptions and to maximize communications interactions.

A yet further advantage of the invention is that multiple communication means can be seamlessly transitioned between communication channels, means, and access numbers.

A still further advantage of the present invention is that design flexibility of new open wireless standards is significantly greater than the relatively closed cellular standards.

A yet further advantage of the present invention is extensive secondary benefits associated with the integrated knowledge of geographic location and ubiquitous communications.

A still further advantage of the present invention is the establishment of special device class to maintain network security amongst traditional network devices.

Other advantages of the present invention derive from the integrated knowledge of context sensitive data, knowledge of geographic location, knowledge of communications device owner identification, knowledge database 19 in communication system, dynamic access and control, and real-time ubiquitous communications.

Additional features and advantages of the present invention are described in and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

BRIEF DESCRIPTION OF THE DRAWINGS

The present invention will now be described in more detail with reference to the accompanying drawings, in which.

DETAILED DESCRIPTION OF THE PRESENTLY PREFERRED EMBODIMENTS

Figure 1:
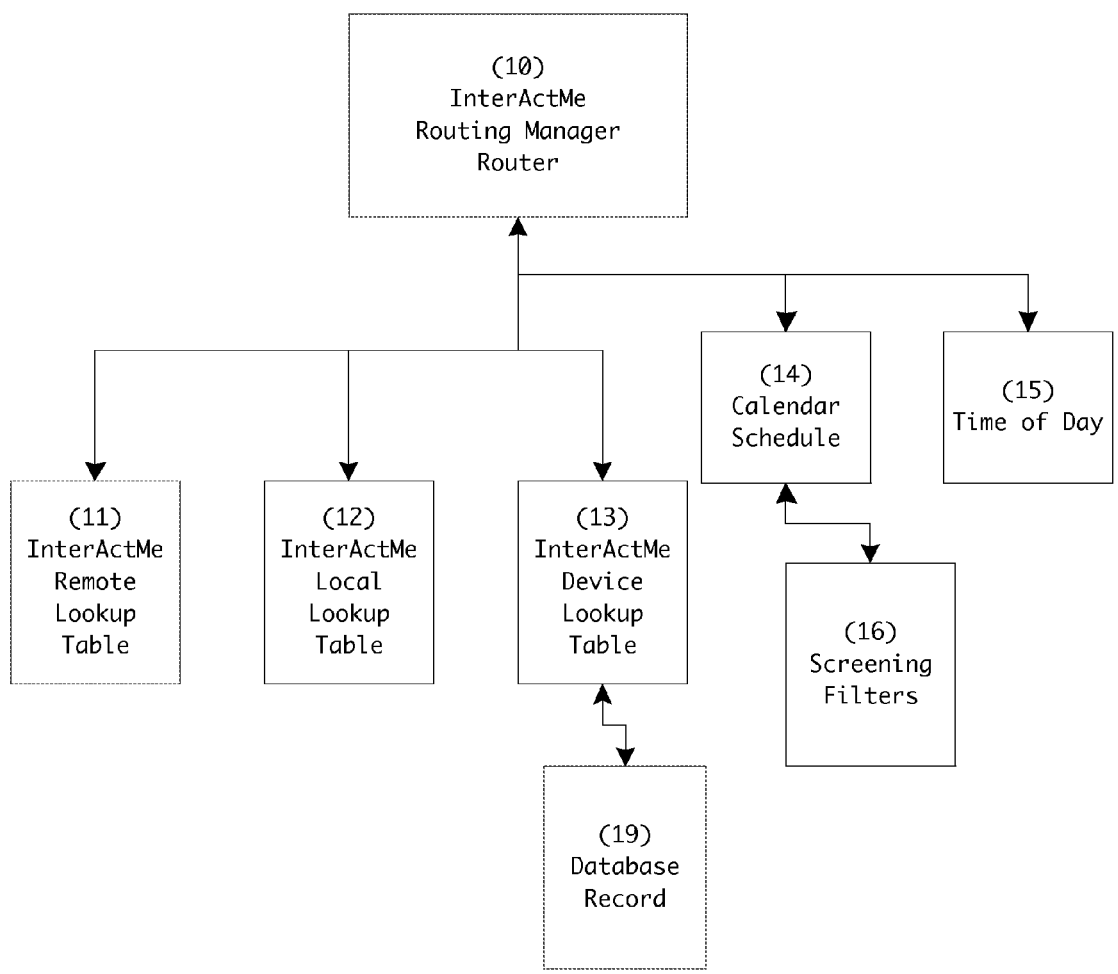
FIG. 1 is a schematic depicting three data lookup tables utilized by the data router.

A dynamic communications system and methods for comprising a combination of (A) a wireless communication device with two separate transceivers and a unique access number, (B) said transceiver with a short-range wireless or wired transceiver and long-range wireless transceiver, (C) a communication management system from the group of local communication management system for individual coordinated device connectivity, distributed communication management system for management of multiple communication devices, (D) said communication management system performing dynamic switching of communication transceivers and dynamic addressing of communication devices when used in a wireless communications system, has a number of advantages, including increased cost effectiveness, increased long-range wireless resource capacity, increased communications flexibility, superior management flexibility and providing seamless and stable performance.

The wireless communication device is with configured both a short-range wireless or wired channel and a long-range wireless channel, and a corresponding InterActMe number, hereinafter referred to as "InterActMe Device", useful in this invention are those of standard wired and wireless means. The standard wireless means are selected from the group of wireless optical means, wireless power-line carrier means, wireless radio-frequency means, and wireless radar means. For example, infrared, Bluetooth, cellular or other suitable wireless communications means may be used to form a communications link. The standard wired means are selected from the group of serial, parallel, USB, Firewire, Ethernet, optical fiber, and RS-485 port communication.

The preferred short-range communications means is influenced by a number of factors, including cost effectiveness, range and protocol characteristics (superior protocols are efficient in their bandwidth utilization and handle numerous devices simultaneously). Preferred short-range communication means have minimal interference from the long-range wireless means and from a multiple of short-range devices (expressed in terms of the number average value of the maximum nodes number within the operating range) of from about 1 device and 10,000 devices. More preferred short-range communications means have a maximum nodes number of from about 10 devices to about 256 devices. Particularly preferred short-range communications means have a particle maximum node number of from about 256 devices. Above about 256 devices, the interference factor affects the stability of the communications link outweighing the benefits of multiple devices. Within the preferred range, some of the protocols may utilize code division multiplexing to increase the effective bandwidth.

The preferred long-range wireless means is influenced by a number of factors, including cost effectiveness, range and protocol characteristics (superior protocols are efficient in their bandwidth utilization and handle numerous devices simultaneously). Preferred long-range wireless means have minimal interference from the short-range wireless means and from a multiple of long-range wireless devices (expressed in terms of the number average value of the maximum nodes number within the operating range) of from about 1 device and 100,000 devices and various multiplexing schemes. More preferred long-range wireless means have a maximum nodes number of from about 100 devices to about 10,000 devices. Particularly preferred long-range wireless means have a maximum node number from about 1,000 devices with code division multiplexing or time division multiplexing and spread spectrum. More preferred long-range wireless means utilize code division multiplexing and spread spectrum radio frequency cellular communications standards.

Preferred unique access numbers for identifying the specific owner of communication device have a broad range of possibilities, hereinafter referred to as "InterActMe Access Number". Exemplary unique access numbers include a standard telephone number, an Internet Protocol address, a government assigned identification number (such as Social Security Number with a preceding country code), or a company assigned 128 bit encrypted number.

In the preferred embodiment, the local communication management system for individual coordinated device connectivity of each InterActMe Device seeks to establish a communications link with the short-range channel preferably over the long-range channel. The short-range link is preferably utilized when ample signal strength and bandwidth is available, and authorized access & registration is acknowledged. This provides reduced cost associated with more expensive cellular resources and service provider.

In the preferred embodiment, the communications link is utilized to transfer digital data and analog data that represents data and voice between the originator and terminator(s) over the chosen channel to their respective access number(s), utilizing their respective protocols as managed by a communication management system. Both a local communication management system on the InterActMe Device and distributed communication management system manage and coordinate the actions and interactions between the individual components at the communications device level and all InterActMe devices respectively.

Figure 5:
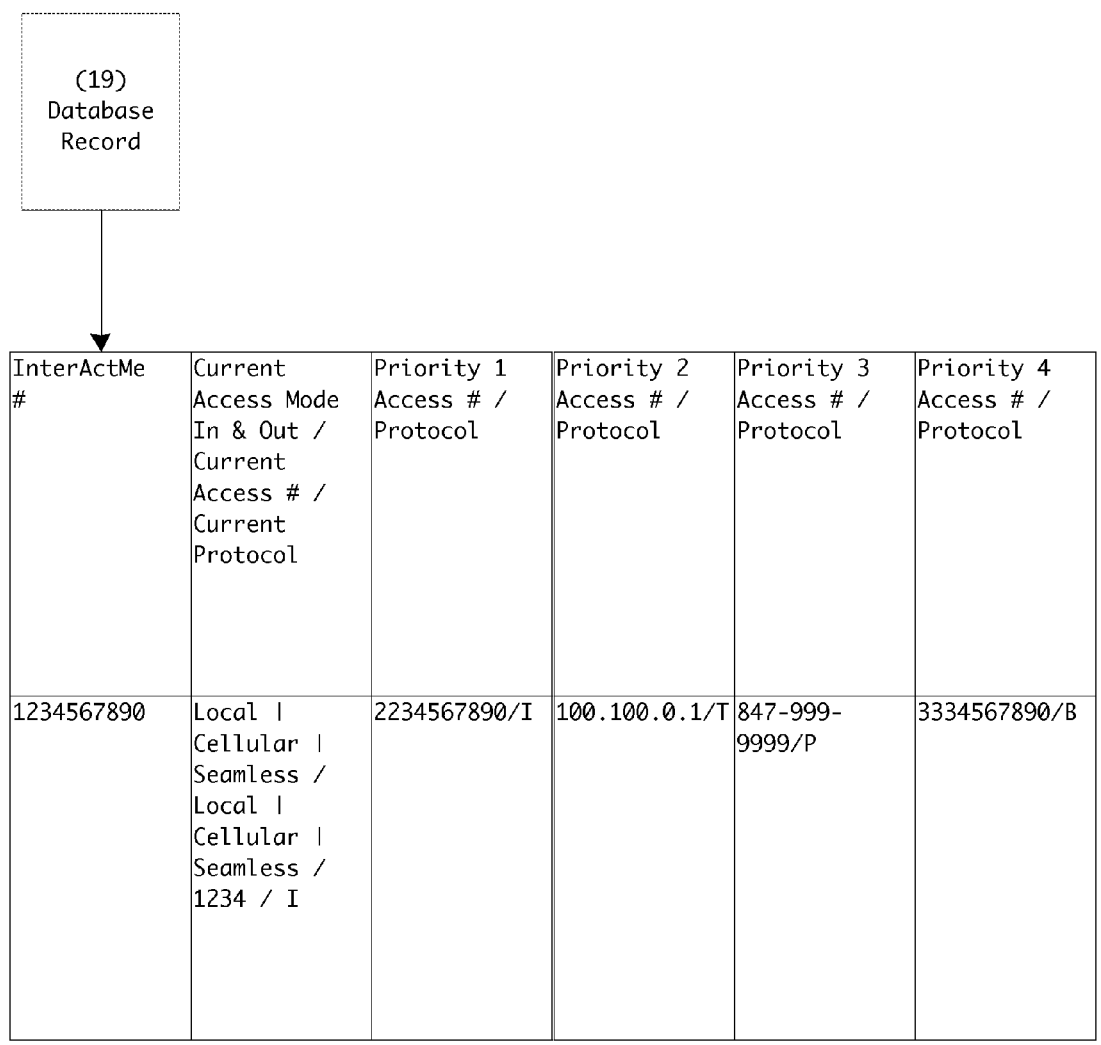
FIG. 5 is a schematic depicting one database record 19 for one communication device in the inventive manner indicating dynamic connectivity information.

Particularly preferred communications links are between InterActMe access numbers that are cross-referenced in the InterActMe Lookup Table (FIG. 1 #13), which is utilized to provide current access number(s) or sequential prioritization of access number(s) by the InterActMe Routing Manager (FIG. 1 #10) as detailed in the table shown as FIG. 5. Exemplary database 19 fields include: Current Access Mode In & Out, Current Access Number, Current Protocol, Current Dynamic Address, a series of Priority Numbers in sequential preference order with their respective Protocol, and e-mail Address all cross-referenced (e.g., index) by the InterActMe Access Number. The method may further include InterActMe Access Numbers with their respective protocols for a wide range of data content. Exemplary types of data content include fax, e-mail, voice-mail, cellular, dynamic or static Internet Protocol address with their respective protocols. The method may further include a wide range of personal, professional, and marketing information in an object oriented, relational, semantic, or flat-file database 19 cross-referenced by InterActMe Access Number. Said Current Access Mode In & Out is the parameter to store the mode of operation for the InterActMe Device respectively for calls initiated by the device and calls terminated to the device. Said Current Access Number is the parameter that stores any call forwarding access numbers in the event that the InterActMe Access Number is not otherwise available. Said Current Protocol is the parameter to store the communication protocol utilized to establish a communication link at the aforementioned Current Access Number. Said Current Dynamic Address is the parameter to store the InterActMe assigned address currently being utilized in the communication link. The Current Dynamic Address includes the identification of InterActMe Local Channel Manager and InterActMe Remote Channel Manager in addition to the unique identifier of channel at the respective channel manager.

Figure 3:
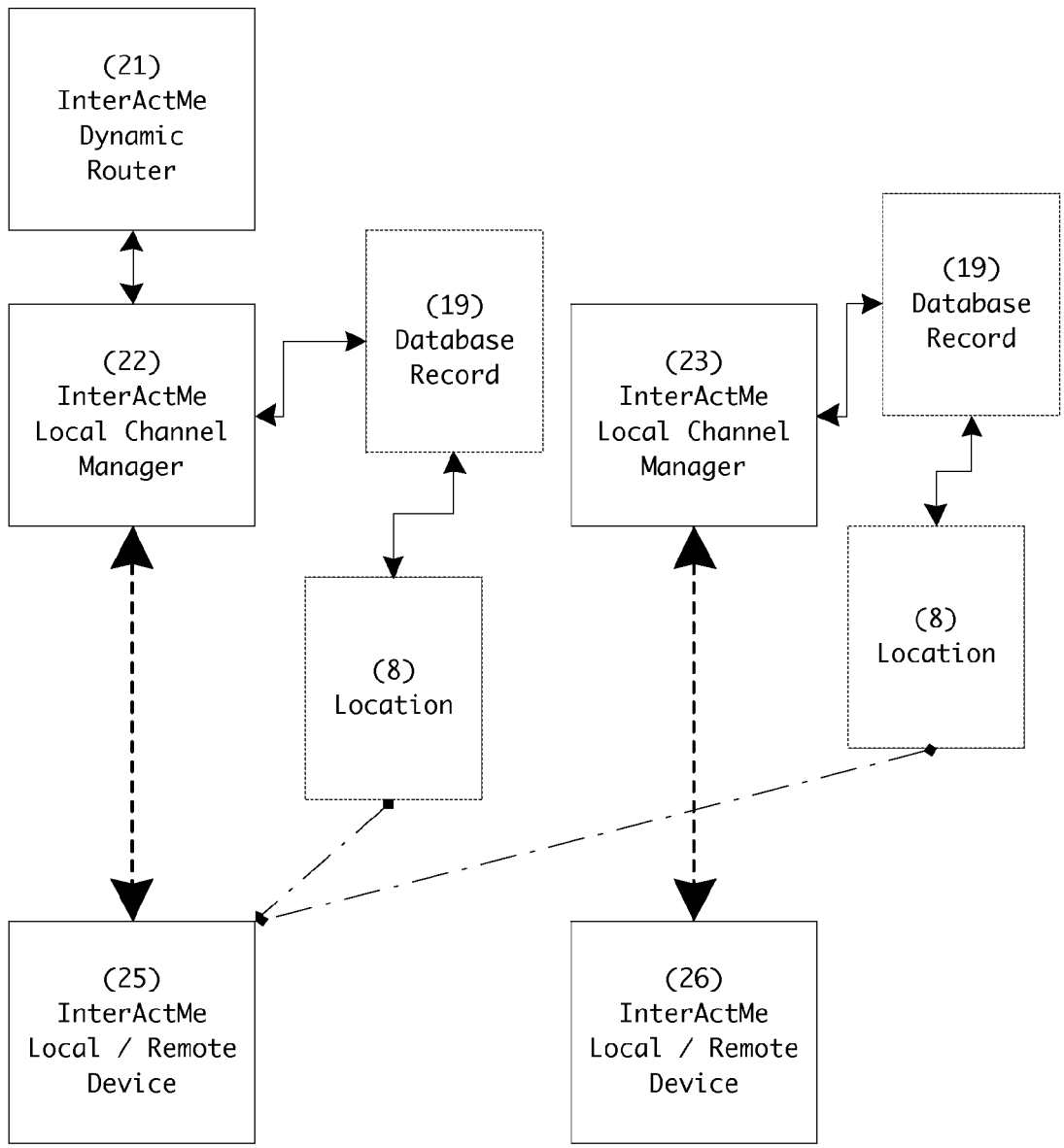
FIG. 3 is a schematic illustration of communication links between multiple devices operating in the inventive manner in a local area network with multiple access points.

Each InterActMe in the preferred embodiment can operate in accordance to two Local Modes of operation that include Static Local Channel Manager (FIG. 4) and Dynamic Local Channel Manager (FIG. 3). In the event that the existing short-range link falls below the local threshold of signal strength and bandwidth availability from the InterActMe Local Channel Manager (FIG. 4 #32) a warning signal is generated on the InterActMe (FIG. 4 #33) while in either Local Mode. The short-range link is maintained until the signal strength and bandwidth availability fall below the dropout specification.

Each InterActMe Device in the more preferred embodiment operates in the Dynamic Local Channel Manager mode. The InterActMe Device, while in the Dynamic Local Channel Manager mode, transfers the communications link from the original InterActMe Local Channel Manager (FIG. 3 #22) to the next InterActMe Local Channel Manager (FIG. 3 #23) as it enters its' coverage area. Both Local Modes ensure a seamless communications link between the authorized InterActMe Device to other authorized InterActMe Device(s), solely through the InterActMe Local Channel Manager(s). The Local Communication Management System is capable of establishing a communications link between one InterActMe Device to another InterActMe Device directly as further enabled or disabled at its respective device, though limited by the strict implementation of the short-range access protocol, independent of the InterActMe System.

The preferred embodiment further includes sub-modes of the Local Mode for each InterActMe Device whereby the device operates as either a telephone or walkie-talkie. The exemplary telephone mode enables the making and receiving of a "phone call" in the same end-user procedural manner as the standard plain old telephone. The InterActMe system, however, orchestrates the translation of access number(s) in accordance to the invention disclosure transparent to the end-user. A "phone call" includes exemplary standard phone features such as conference calling, call waiting, call forwarding, voice mail retrieval and recording, and pager operations. The exemplary walkie-talkie mode enables asynchronous communications between multiple InterActMe Devices in the same end-user procedural manner as the standard two-way radio. The InterActMe System again, however, orchestrates the translation of access number(s) in accordance to the invention disclosure transparent to the end-user.

Figure 4:
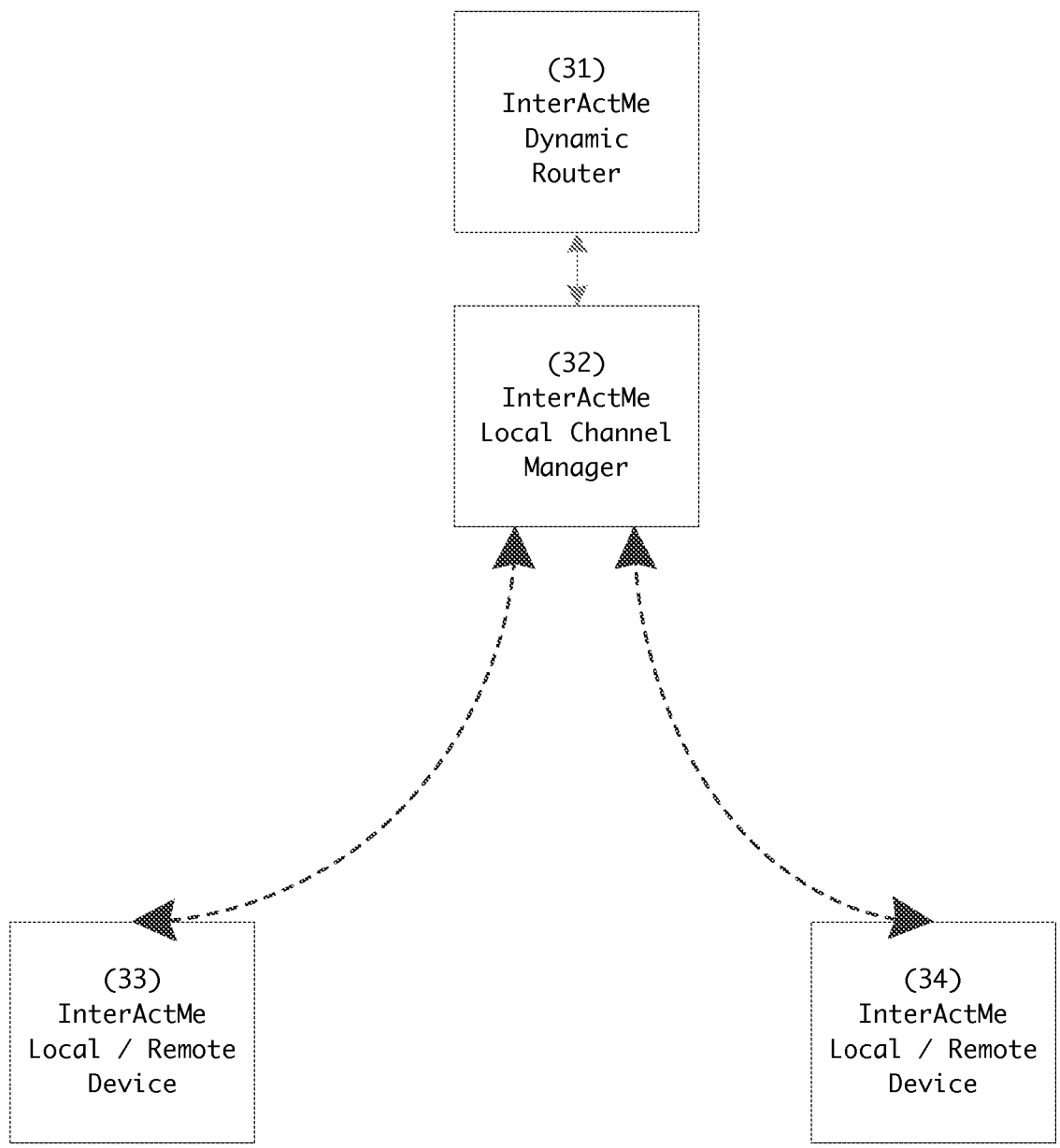
FIG. 4 is a schematic illustration of communication links between multiple devices operating in the inventive manner in a local area network within the same access point.

An exemplary operational procedure of the Static Local Channel Manager is generally as follows:

- InterActMe Local/Remote Device (FIG. 4 #33) registers with the InterActMe Local Channel Manager (FIG. 4 #32) its presence.
- InterActMe Local/Remote Device (FIG. 4 #33) requests a phone call or walk-talkie communication with a specified access number(s) to the InterActMe Local Channel Manager (FIG. 4 #32). The specified access number(s) can be other InterActMe numbers or traditional telephone numbers (that include fax, pager, cellular, and plain old telephone system).
- InterActMe Local Channel Manager (FIG. 4 #32) communicates with InterActMe Dynamic Router (FIG. 4 #31) to determine the communications link to the requested access number(s).
- InterActMe Local Channel Manager (FIG. 4 #32) establishes the communications link to the other InterActMe Local/Remote Device (FIG. 4 #34) with the requested access number(s).
- Either InterActMe Local/Remote Device (FIG. 4 #33) or InterActMe Local/Remote Device (FIG. 4 #34) can terminate the communications link at any time.

An exemplary operational procedure of the Dynamic Local Channel Manager is generally as follows:

- InterActMe Local/Remote Device (FIG. 3 #25) registers with the InterActMe Local Channel Manager (FIG. 3 #22) its presence.
- InterActMe Local/Remote Device (FIG. 3 #25) requests a phone call or walkie-talkie communication with a specified access number(s) to the InterActMe Local Channel Manager (FIG. 3 #22). The specified access number(s) can be other InterActMe numbers or traditional telephone numbers (that include fax, pager, cellular, and plain old telephone system).
- InterActMe Local Channel Manager (FIG. 3 #22) communicates with InterActMe Dynamic Router (FIG. 3 #21) to determine the communications link to the requested access number(s).
- InterActMe Local Channel Manager (FIG. 3 #22) established the communications link to the other InterActMe Local/Remote Device (FIG. 3 #26) with the requested access number(s) through the determined InterActMe Local Channel Manager (FIG. 3 #23).
- The InterActMe Local Channel Manager (FIG. 3 #22) that has the established communications link, hereinafter referred to as access port, with the InterActMe Local/Remote Device (FIG. 3 #25), hereinafter referred to as access node, is responsible for maintaining the strength of signal communications link between the access port and access node in accordance to the "local threshold". In the event that the existing short-range link falls below the local to another local switch threshold, hereinafter referred to as "local threshold" (e.g., signal strength and bandwidth availability) a warning signal is generated on the InterActMe. The InterActMe Local Channel Manager (FIG. 3 #23) is likewise responsible for InterActMe Local/Remote Device (FIG. 3 #26) in the same manner.
- The InterActMe Local Channel Manager (FIG. 3 #22) moves the access port seamlessly to the next InterActMe Local Channel Manager as determined by the InterActMe Dynamic Router (FIG. 3 #21) in a seamless manner.
- Either InterActMe Local/Remote Device (FIG. 3 #25) or InterActMe Local/Remote Device (FIG. 3 #26) can terminate the communications link at any time.

Multiple sub-modes of the two Local Modes (Dynamic Local Channel Manager and Static Local Channel Manager) are anticipated in the preferred embodiment. Exemplary sub-modes include:

- InterActMe can initiate "phone call" through one InterActMe Local Channel Manager.
- InterActMe can initiate "phone call" through one initiating InterActMe Local Channel Manager and another receiving InterActMe Local Channel Manager.
- InterActMe can initiate "walkie-talkie" directly to other InterActMe devices without any interaction of InterActMe Local Channel Manager.
- InterActMe can receive "phone call" through an InterActMe Local Channel Manager.
- InterActMe can initiate "phone call" through an InterActMe Local Channel Manager to other InterActMes on the same InterActMe Local Channel Manager.
- InterActMe can enable seamless access from the one initiating InterActMe Local Channel Manager to the next InterActMe Local Channel Manager, which becomes the new "initiating" InterActMe Local Channel Manager.

While in Cellular Mode, only the long-range link is enabled for communication. The InterActMe device's short-range abilities are effectively disabled. This mode effectively prevents the presence detection of an InterActMe Local Channel Manager from establishing any form of communications with the InterActMe. Cellular Mode is analogous to the Dynamic Local Channel Manager, yet replaced with the Cellular Base Station (FIG. 2 #4).

An exemplary operational procedure of the InterActMe Cellular Base Station is generally as follows:

InterActMe Local/Remote Device (FIG. 2 #5) registers with the Cellular Base Station (FIG. 2 #4) its presence.

Figure 2:
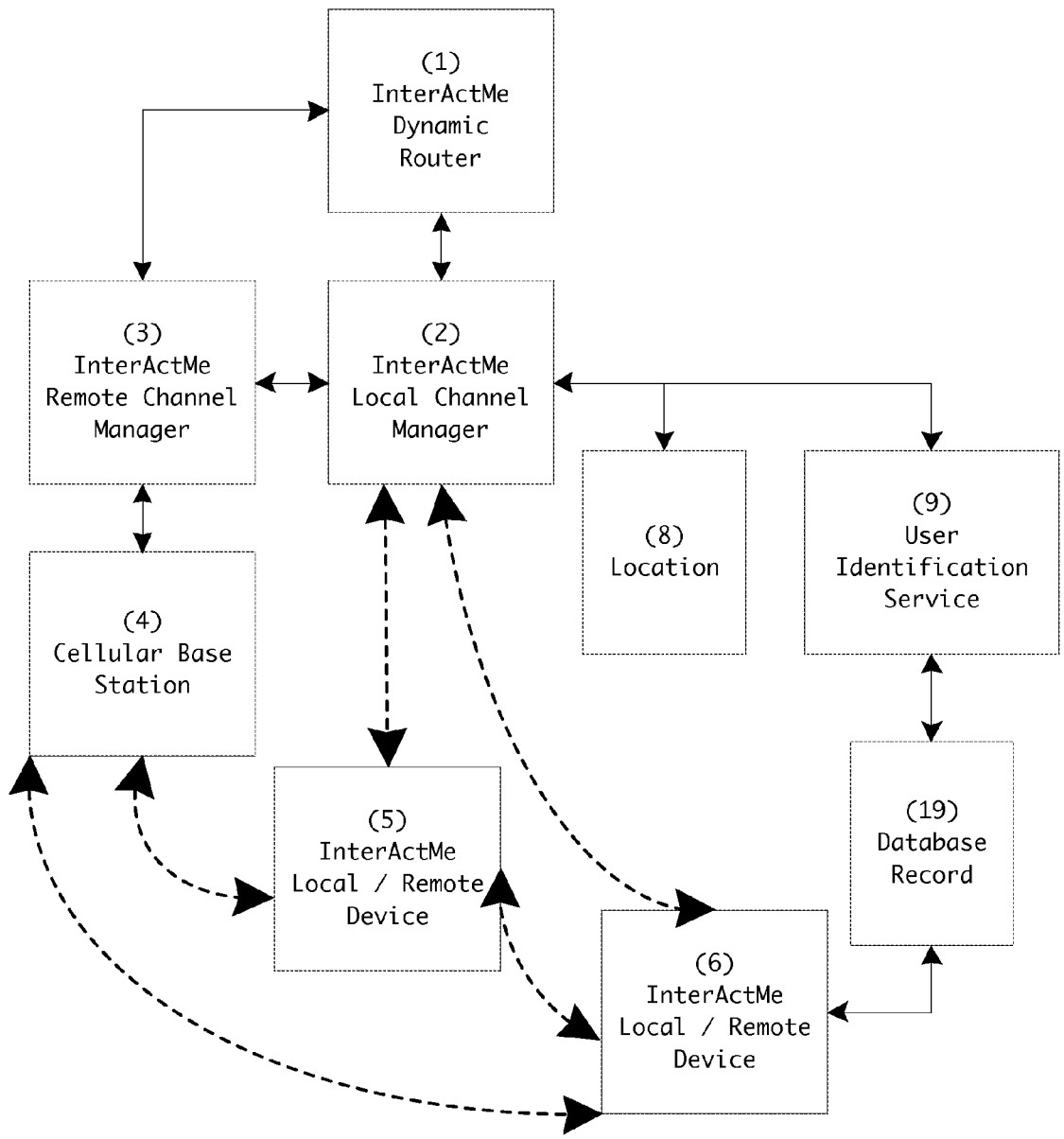
FIG. 2 is a schematic illustration of communication links between multiple devices operating in the inventive manner in a wide area network.

InterActMe Local/Remote Device (FIG. 2 #5) requests a phone call or walk-talkie communication with a specified access number(s) to the InterActMe Remote Channel Manager (FIG. 2 #3). The specified access number(s) can be other InterActMe numbers or traditional telephone numbers (that include fax, pager, cellular, and plain old telephone system).

InterActMe Remote Channel Manager (FIG. 2 #3) communicates with InterActMe Dynamic Router (FIG. 2 #1) to determine the communications link to the requested access number(s).

InterActMe Remote Channel Manager (FIG. 2 #3) established the communications link to the other InterActMe Local/Remote Device (FIG. 2 #6) with the requested access number(s) through the determined InterActMe Local Channel Manager (FIG. 2 #6).

The Cellular Base Station (FIG. 2 #4) that has the established communications link, hereinafter referred to as access port, with the InterActMe Local/Remote Device (FIG. 2 #5), hereinafter referred to as access node, is responsible for maintaining the strength of signal communications link between the access port and access node in accordance to the "remote threshold". The Cellular Base Station (FIG. 2 #4) is likewise responsible for maintaining the communications link with the InterActMe Local/Remote Device (FIG. 2 #5).

The Cellular Base Station (FIG. 2 #4) moves the access port seamlessly to the next Cellular Base Station (FIG. 2 #4) as determined by the service control unit of the standard cellular infrastructure in a seamless manner.

The InterActMe Local Channel Manager (FIG. 2 #2) maintains and establishes the communications link to the other InterActMe Local/Remote Device (FIG. 2 #6) with the requested access number(s). The access number(s) are controlled in accordance with the selected operational mode of the respective InterActMe access number.

Either InterActMe Local/Remote Device (FIG. 2 #5) or access InterActMe Local/Remote Device (FIG. 2 #6) can terminate the communications link at any time.

The InterActMe Local/Remote Device (FIG. 2 #5) can also operate as a standard cellular phone. An exemplary operational procedure of the standard cellular phone is generally as follows:

InterActMe Local/Remote Device (FIG. 2 #5) can also simply operate as a standard cellular phone and thus request a phone call with a specified access number, through the Cellular Base Station (FIG. 2 #4), that is a traditional telephone number (that include fax, pager, cellular, and plain old telephone system) or Internet Protocol address.

The Cellular Base Station (FIG. 2 #4) moves the access port seamlessly to the next Cellular Base Station (FIG. 2 #4) as determined by the service control unit of the standard cellular infrastructure in a seamless manner.

Either InterActMe Local/Remote Device (FIG. 2 #5) or connected phone access number can terminate the communications link at any time.

Multiple sub-modes of Cellular Mode are anticipated in the preferred embodiment. Exemplary sub-modes include:

InterActMe can initiate "phone call" through a Cellular Base Station.

InterActMe can receive "phone call" through a Cellular Base Station.

InterActMe can initiate "phone call" through a Cellular Base Station and subsequently through an InterActMe Remote Channel Manager as routed to other InterActMes on their respective InterActMe Local Channel Manager or InterActMe Remote Channel Manager.

InterActMe can receive "phone call" through a Cellular Base Station and subsequently through an InterActMe Remote Channel Manager as routed to other InterActMes on their respective InterActMe Local Channel Manager or InterActMe Remote Channel Manager.

All phone call actions as characterized above can be replaced by walkie-talkie actions, Internet Access to IP address actions.

InterActMe can initiate "walkie-talkie" directly to other InterActMe devices without any interaction of InterActMe Local Channel Manager, InterActMe Remote Channel Manager or Cellular Base Station.

The most preferred embodiment of the invention is for all InterActMe Devices to operate in the Seamless Mode. The Seamless Mode enables dynamic and seamless switching between Cellular Base Station (FIG. 2 #4) and InterActMe Local Channel Manager (FIG. 2 #2), in the event that the existing short-range link falls below the local to remote switch threshold, hereinafter referred to as "seamless threshold" (e.g., signal strength and bandwidth availability). A warning signal is generated on the InterActMe to indicate a switch to and from the remote and local channel manager. The warning signal can optionally be indicative of whether now in remote or local mode. The pitch of the warning signal can differentiate between the two modes. An additional audible signal can be generated periodically as a reminder of the actual operational mode of the Local Communication Management System (short-range or long-range). The short-range link remains the most preferred and thus the primary communications link until the seamless threshold is reached at which time the InterActMe (FIG. 1 #5) initiates a long-range wireless standby communications link through the InterActMe Remote Channel Manager (FIG. 2 #3). Upon the successful establishment of the standby link between the new InterActMe Remote Channel Manager and the current InterActMe Local Channel Manager, in accordance to InterActMe Dynamic Router (FIG. 2 #1) on behalf of the InterActMe (FIG. 1 #5), the communications link is transferred from the current InterActMe Local Channel Manager to the InterActMe Remote Channel Manager. The reverse process occurs when the seamless threshold establishes a short-range standby communications link between the current InterActMe Remote Channel Manager and the new designated InterActMe Local Channel Manager.

The preferred embodiment utilizes an InterActMe Dynamic Router that selects the optimal communications link utilizing an algorithm to minimize customer cost (e.g., preference of local channel manager over remote channel manager), to minimize frequency of switching between local channel managers (e.g., preference of access port with increase signal strength, increased operational range, and consistent with direction of travel), to maximize communications link quality, and to ensure routing capacity availability. Numerous algorithms can be used to determine optimal routing with exemplary factors such as historical performance, membership privileges, and features provided by one local channel manager versus other accessible local channel managers (e.g., security encryption, "home" access port, exclusion list of local channel managers, etc.). Additional algorithms are included in the more preferred embodiment to determine optimal switching time with exemplary factors such as rate of signal strength deterioration or increase, overlap bands in registered thresholds of local threshold, remote threshold, and seamless threshold.

The more preferred embodiment further incorporates dynamic addressing to optimize the communications link throughout the communications infrastructure. Numerous algorithms can be used to determine optimal switching time of dynamic address with exemplary factors such as time to register a new dynamic address (to avoid switching latency that may jeopardize seamless link between two channel managers). Numerous methods are available to achieve the desired benefits of dynamic addressing with one exemplary method of Dynamic Host Configuration Protocol (DHCP) server, the historically traditional issuer of dynamic addresses on a local basis. Additional methods include a Network Address Translation (NAT) server. The more preferred method is the InterActMe Routing Management System implementing a dynamic addressing scheme and comprised of a network of distributed InterActMe Routing Managers. Said dynamic addressing scheme provides for algorithms that optimize the selection of an address for each InterActMe Device throughout the entire communications process, not solely during the establishment of the communications device as a recognized device and not solely during the establishment of the initial communications link. Further methods incorporated into the preferred embodiment of the invention include the direct linking of "remote" addresses to a local table of corresponding "local" addresses. The resulting benefits of dynamic addressing are reduced communication latency times, ability to use priority designated tunnels of communication between all InterActMe Remote Channel Managers and InterActMe Local Channel Managers, and the ability of a wide range of devices to serve within one integrated and unified communications system.

The more preferred embodiment establishes a special device class to differentiate between InterActMe Devices and non-InterActMe Devices (e.g., standard network devices). Improved network security is maintained by enabling a limited range of communications as compared to traditional Internet Protocol (IP) communications to InterActMe Devices. The method may further include an extension of traditional caller identification systems (Caller-ID) to become a true unified communications system. Each InterActMe Device takes advantage of said extended Caller-ID features by making known to the desired call terminator InterActMe Device both the call originator (standard caller id) and the desired call terminator (extended caller id). This feature is highly desirable of an InterActMe device especially under the dynamic addressing scheme due to one InterActMe Device serving effectively multiple InterActMe access numbers concurrently. The Caller-ID access number or prior referenced names can be alternatively shown or vocalized using a text to speech synthesizer.

The call terminator is a critical parameter, within the preferred embodiment of the InterActMe System, in the determination of handling procedure to establish communication link. Exemplary of this importance is a business communications link being routed to voice mail directly in accordance to a time of day 15 and calendar schedule 14. Therefore the unified communications system avoids undesirable interruptions. Further process handling can be easily achieved such as screening-in or screening-out filters 16. The method may further include a distinct ring to distinguish between a certain call terminator and others. A further exemplary is a children's communication link being routed to voice mail directly in accordance to a time of day 15 and calendar schedule 14 along with screen-in and/or screen-out filters 16. The freedom and flexibility of every employee, family member, etc. having their own InterActMe device introduces significant management demands to effectively disable certain communications links at specified times.

Each InterActMe in the preferred embodiment is further capable, within the full functionality of the InterActMe system, to make known its geographic location 8 through the known location 8 of each active InterActMe Local Channel Manager, with further geographic location 8 determination by triangulation of signal strengths of multiple InterActMe Local Channel Managers. An InterActMe can be further configured with a global positioning system (GPS), said GPS establishes precise location through triangulation with multiple satellite systems, to establish precise geographic location 8. An InterActMe can be further configured with a local positioning system (LPS), said LPS establishes precise location through triangulation with multiple local transmitting systems, to establish precise geographic location 8. When such precise geographic location 8 is known, the InterActMe system is further capable of proactively utilizing this location 8 for displaying graphically the location to the specified parties authorized to know such information, for conveying geographic specific messages such as the issuance of a welcome message. The welcome message can take the form of a walkie-talkie voice message, a phone call voice message, an e-mail message, issuance of coupons, or simply an acknowledgement of registration. Other purposes of geographic location 8 include safety, marketing, optimal routing, addressing, and communications link, audit trail for payroll, audit trail for security, to individual profiling.

The preferred embodiment may further include software to control the InterActMe Local Channel Manager to exclude any third party from knowledge of presence, audit trail, billing, and communication latency. The owner of the Local Channel Manager may further subscribe to a user identification service 9 to learn a wide range of information about the InterActMe owner. Information may further include buying preferences, knowledge of geographic location 8 restrictions, customer identification.

In yet another alternative embodiment, the InterActMe system can further utilize the knowledge of geographic location 8 coupled with the system's database 19 knowledge of known geographic locations 8 and coverage areas of every InterActMe Local Channel Manager to enable or disable the utilization of the short-range communication mode, thereby conserving battery power and communications bandwidth.

In yet another alternative embodiment, the InterActMe in the preferred embodiment is further capable, within the full functionality of the InterActMe system, of utilizing an integrated data scanner (e.g., read system such as radio frequency identification tags, optical readers, infrared transceiver, bar code etc.) to trigger specific messages between InterActMe and InterActMe Local Channel Manager (or alternatively to the InterActMe Remote Channel Manager). Utilization of scanned information initiates the conveying of a wide variety of context sensitive information. Included in this context sensitive scheme, though not limited, are the following: a) registration of an individual InterActMe into a specific channel manager, b) inquiry of product pricing information and/or generation of manufacturer's coupon, c) broadcast of known geographic location 8 to InterActMe system, d) broadcast of user's identification to a specific registered device, and e) authorization to initiate the sending of encrypted transactional information.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A communication management system comprising a data router, a routing management system, a wireless communication device and a local channel manager having a database record for the wireless communication device, whereby the routing management system establishes a communication link to the wireless communication device having an access number and owner identification, wherein the local channel manager has a user identification service with buyer preferences including buyer preferences for the owner of the wireless communication device, whereby the routing management system establishes the communication link in accordance to a time of day and a calendar schedule operable to avoid undesirable interruptions, whereby the database record having an access number of the wireless communication device and a known geographic location of the wireless communication device, and the routing management system is operable for the data router to establish knowledge of a context sensitive data integrated by knowledge of the geographic location for the wireless communication device and knowledge of the wireless communication device owner identification.

2. The communication management system according to claim 1, further comprised of a geographic location restriction with at least one of screen-in or screen-out filter operable to avoid undesirable interruptions.

3. The communication management system according to claim 1, wherein the user identification service with buyer preferences for the access number further include personal, professional, and marketing information in an object oriented or semantic database cross-referenced by the wireless communication device access number.

4. The communication management system according to claim 1, wherein the geographic location of the wireless communication device is utilized to the limit undesirable interruptions with at least one of screen-in or screen-out filter.

5. The communication management system according to claim 1, further comprised of any third party and software, whereby the software is operable to control the local channel manager to exclude the any third party from knowledge of presence or audit trail of the wireless communication device.

6. The communication management system according to claim 1, wherein the wireless communication device initiates an inquiry of product pricing information, a generation of manufacturer product coupon, or an authorization to send encrypted transactional information.

7. The communication management system according to claim 1, further comprised of any third party and software, whereby the software is operable to control the local channel manager to exclude the any third party from knowledge of billing or communication latency of the wireless communication device.

8. The communication management system according to claim 1, wherein the wireless communication device is further comprised of an integrated data scanner to trigger specific marketing messages.

9. The communication management system according to claim 8, wherein the integrated data scanner is a bar code scanner, radio frequency identification tag reader, optical reader, or infrared transceiver.

10. A communication management system comprising a data router, a routing management system, a wireless communication device and a local channel manager having a database record for the wireless communication device, whereby the routing management system establishes a communication link to the wireless communication device having an access number and owner identification, wherein the local channel manager has a user identification service, any third party, a software to control the local channel manager to exclude the any third party from knowledge of presence, audit trail, billing, or communication latency of the wireless communication device and whereby the database record has an access number of the wireless communication device and a known geographic location of the wireless communication device.

11. The communication management system according to claim 10 further comprised of a user identification service having a database record for the wireless communication device owner and whereby the routing management system is operable for the data router to establish knowledge of a context sensitive data integrated by knowledge of the geographic location for the wireless communication device and knowledge of the wireless communication device owner.

12. The communication management system according to claim 11 wherein the communication link is utilized to convey at least one marketing message and displayed to the wireless communication device having the known geographic location.

13. The communication management system according to claim 12 further comprised of specified parties authorized, wherein the geographic location of the wireless communication device is displayed to the specified parties authorized.

14. A communication management system comprised of a data router, a routing management system, a wireless communication device and a local channel manager having a database record for the wireless communication device, whereby the routing management system establishes a communication link to the wireless communication device having an access number and owner identification, wherein the local channel manager has a user identification service, whereby the routing management system establishes the communication link in accordance to a time of day and a calendar schedule operable to avoid undesirable interruptions, whereby the database record has an access number of the wireless communication device and a known geographic location of the wireless communication device wherein certain of the communications links are disabled at specified times operable to disable the routing of messages to the wireless communication device.

15. The communication management system according to claim 14, further comprised of a geographic location restriction with at least one of screen-in or screen-out filter operable to avoid undesirable interruptions.

16. The communication management system according to claim 14, wherein the user identification service with buyer preferences for the access number further include personal, professional, and marketing information in an object oriented or semantic database cross-referenced by the wireless communication device access number.

17. The communication management system according to claim 14, wherein the geographic location of the wireless communication device is utilized to the limit undesirable interruptions with at least one of screen-in or screen-out filter.

18. The communication management system according to claim 14, further comprised of any third party and software, whereby the software is operable to control the local channel manager to exclude the any third party from knowledge of presence or audit trail of the wireless communication device.

19. The communication management system according to claim 14, wherein the wireless communication device initiates an inquiry of product pricing information, a generation of manufacturer product coupon, or an authorization to send encrypted transactional information.

* * * * *